United States Patent
Shiiba et al.

[19]

[11] Patent Number: 5,807,204
[45] Date of Patent: Sep. 15, 1998

[54] VEHICLE LOCK-UP CLUTCH CONTROL APPARATUS WHEREIN FULL OR PARTIAL ENGAGEMENT OF CLUTCH IS INHIBITED DURING VEHICLE RUNNING ON UPHILL ROAD

[75] Inventors: Kazuyuki Shiiba; Tooru Matsubara; Yoshiharu Harada; Kunihiro Iwatsuki, all of Toyota, Japan

[73] Assignee: Toyota Jidosha Kabushiki Kaisha, Toyota, Japan

[21] Appl. No.: 697,460

[22] Filed: Aug. 23, 1996

[30] Foreign Application Priority Data

Aug. 24, 1995 [JP] Japan .................................... 7-216013

[51] Int. Cl.⁶ .................................................. F16H 61/14
[52] U.S. Cl. .......................... 477/176; 477/169; 477/901
[58] Field of Search ............................... 477/64, 65, 169, 477/171, 174, 175, 176, 901

[56] References Cited

U.S. PATENT DOCUMENTS

| | | | |
|---|---|---|---|
| 5,085,104 | 2/1992 | Kouno et al. ........................ | 477/901 X |
| 5,101,350 | 3/1992 | Tokoro ................................. | 477/78 X |
| 5,154,250 | 10/1992 | Murai ................................. | 477/108 X |
| 5,267,158 | 11/1993 | Sakaguchi et al. ................. | 477/174 X |
| 5,406,862 | 4/1995 | Amsallen ............................. | 477/901 X |
| 5,480,363 | 1/1996 | Matsubara et al. .................. | 477/80 X |
| 5,531,654 | 7/1996 | Ishikawa et al. .................... | 477/901 X |
| 5,547,438 | 8/1996 | Nozaki et al. ........................ | 477/169 |
| 5,611,748 | 3/1997 | Kashiwabara ....................... | 477/901 X |
| 5,611,750 | 3/1997 | Kono et al. .......................... | 477/169 X |
| 5,620,390 | 4/1997 | Kono et al. .......................... | 477/65 |
| 5,626,535 | 5/1997 | Kono et al. .......................... | 477/169 |
| 5,626,536 | 5/1997 | Kono et al. .......................... | 477/169 X |
| 5,643,136 | 7/1997 | Kono et al. .......................... | 477/175 X |

FOREIGN PATENT DOCUMENTS

| | | |
|---|---|---|
| 40 28 710 | 3/1991 | Germany . |
| 2-212668 | 8/1990 | Japan . |
| 5-180329 | 7/1993 | Japan . |
| 6-331022 | 11/1994 | Japan . |

*Primary Examiner*—Charles A. Marmor
*Assistant Examiner*—Peter T. Kwon
*Attorney, Agent, or Firm*—Oblon, Spivak, McClelland, Maier & Neustadt, P.C.

[57] ABSTRACT

An apparatus for controlling a lock-up clutch for direct connection of an engine and an automatic transmission of a motor vehicle, the apparatus including a slip control device for selectively placing said lock-up clutch in one of a fully released state, a fully engaged state, and a partially engaged state, an uphill road detecting device for detecting that a road on which the motor vehicle is running is an uphill road; and a slip control inhibiting device for inhibiting the slip control device from placing the lock-up clutch in the fully or partially engaged state, if the uphill road is detected by the uphill road detecting device, so that undesirable repeated switching of the clutch between the fully released state and the fully or partially engaged state during uphill road running of the vehicle is prevented.

6 Claims, 9 Drawing Sheets

FIG. 2

| SHIFT POSITION | | | No.1 | No.2 | No.3 | No.4 | SLU | SLN | C-1 | C-2 | C-0 | B-1 | B-2 | B-3 | B-4 | B-0 |
|---|---|---|---|---|---|---|---|---|---|---|---|---|---|---|---|---|
| P | | | ○ | × | × | × | × | × | × | × | × | × | × | × | ○ | × |
| R | (V<20) | | × | × | × | ○ | × | × | × | ○ | × | × | × | × | ○ | ○ |
| R | (V≥20) | | ○ | ○ | × | ○ | × | × | × | × | × | × | × | × | × | × |
| N | | | ○ | × | × | × | × | × | × | × | × | × | × | × | ○ | × |
| D・3・2・(L) | 1st | NORMAL | ○ | × | ○ | ○ | × | × | ○ | × | × | × | × | × | × | × |
| | | ENGINE BRAKE | ○ | × | ○ | × | × | ○ | ○ | × | ○ | × | × | × | ○ | × |
| | 2nd | NORMAL | ○ | ○ | ○ | ○ | × | × | ○ | × | ○ | × | × | × | × | × |
| | | ENGINE BRAKE | × | ○ | ○ | × | ◎ | ○ | ○ | × | ○ | × | × | ○ | × | × |
| | 3rd | NORMAL | × | ○ | ○ | ○ | ◎ | × | ○ | ○ | ○ | × | ○ | ○ | × | × |
| | | ENGINE BRAKE | × | ○ | ○ | × | ◎ | ○ | ○ | ○ | ○ | ○ | ○ | × | × | × |
| | 4th | | × | × | ○ | ○ | ◎ | × | ○ | ○ | ○ | × | ○ | × | × | × |
| | 5th | | × | × | × | ○ | ◎ | × | ○ | ○ | × | × | ○ | × | × | ○ |

LEGEND:
○ : ON
× : OFF
◎ : ON; L-UP ON  OFF; L-UP OFF

ENGAGED
RELEASED —

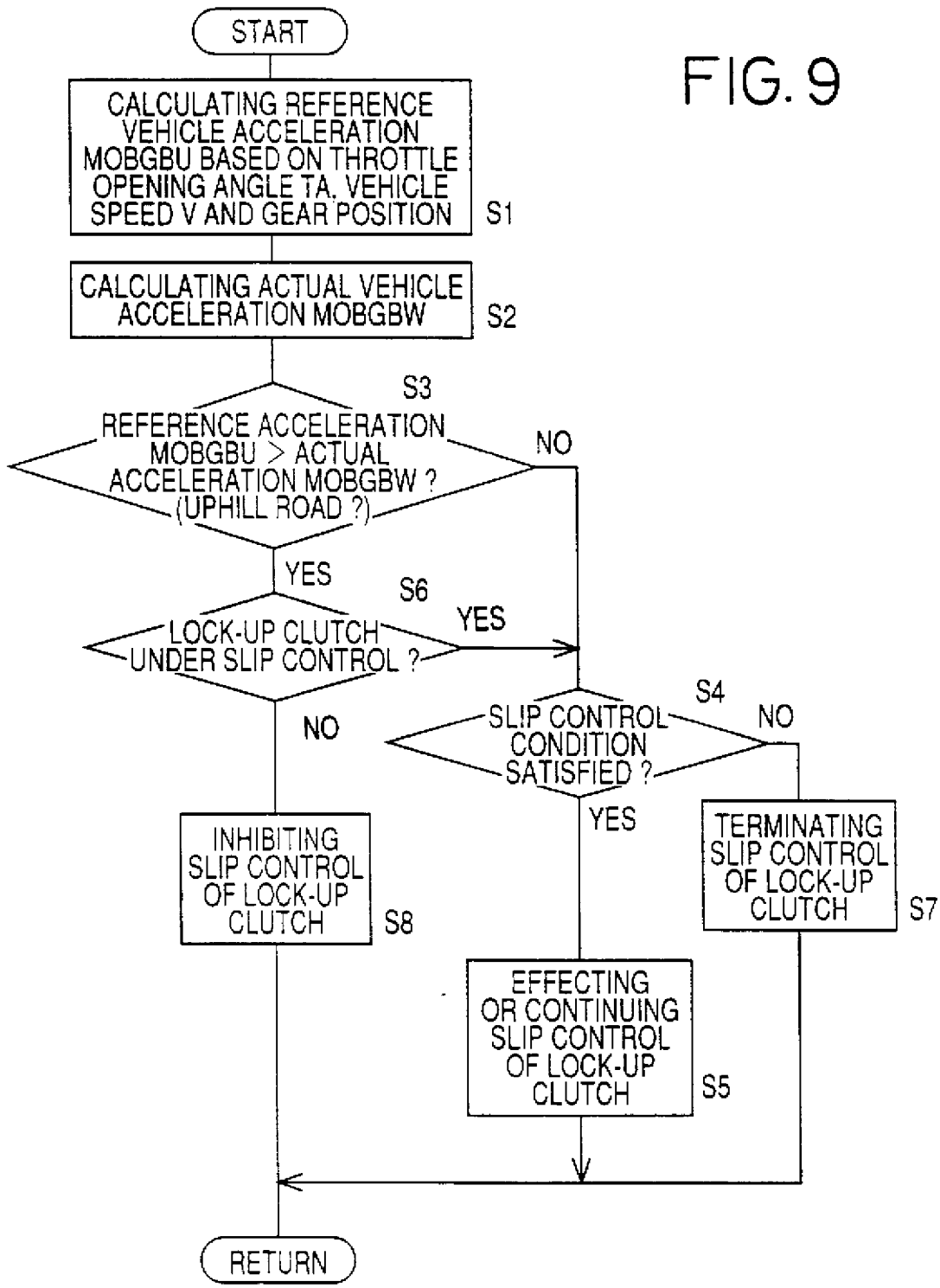

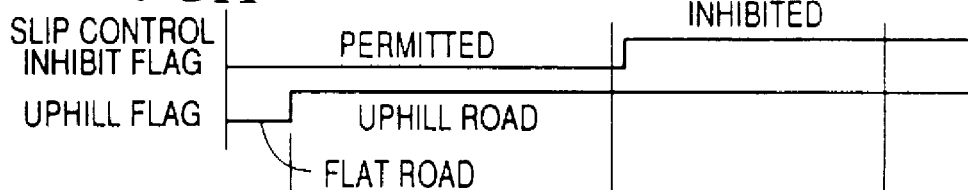
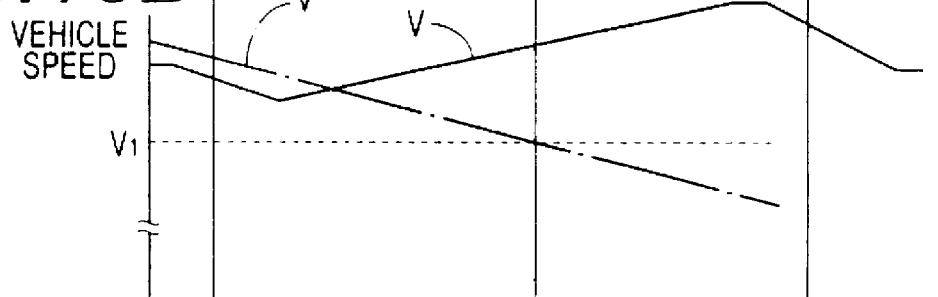
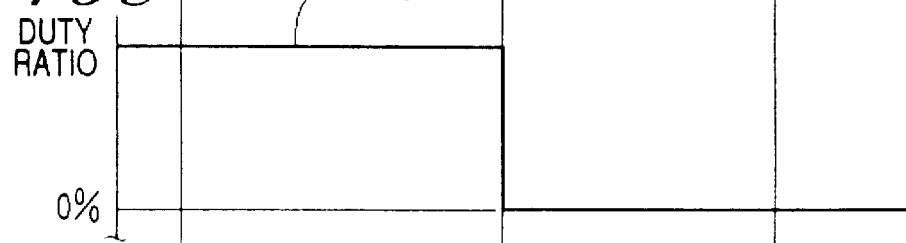
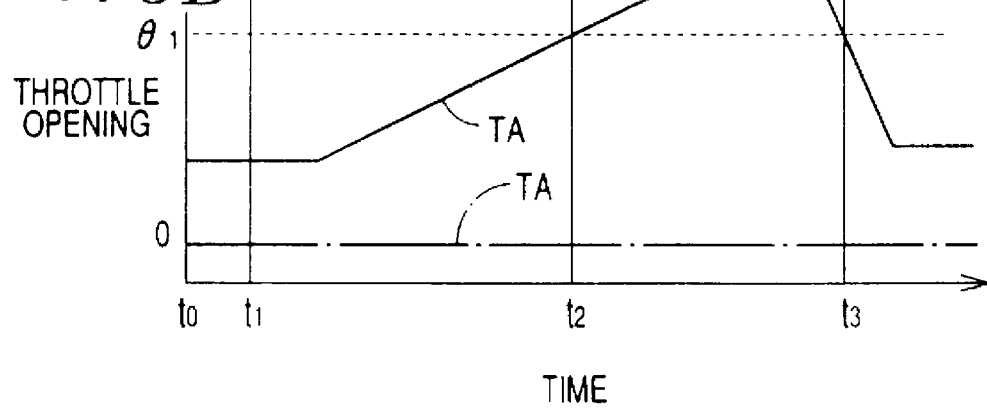
TIME

VEHICLE LOCK-UP CLUTCH CONTROL APPARATUS WHEREIN FULL OR PARTIAL ENGAGEMENT OF CLUTCH IS INHIBITED DURING VEHICLE RUNNING ON UPHILL ROAD

BACKGROUND OF THE INVENTION

1. Field of the Invention

The present invention relates to an apparatus for controlling a lock-up clutch which is provided in a power transmitting system of a motor vehicle, for direct connection of an engine to an automatic transmission.

2. Discussion of the Related Art

In a motor vehicle having a fluid-filled power transmitting device equipped with a lock-up clutch, such as a torque converter or fluid coupling incorporating such a lock-up clutch for direct connection of an engine and an automatic transmission, it is proposed to control the lock-up clutch in a slip control mode (partially slipping or engaging mode) such that an actual amount of slip (i.e., actual slip speed Ne-Nin) of the lock-up clutch, namely, a difference between the speed (Ne) of the engine and the speed (Nin) of the automatic transmission eventually coincides with a predetermined target slip speed, during acceleration of the vehicle, for the purpose of minimizing power loss at the lock-up clutch and improving the fuel economy of the vehicle. The slip control mode is established when the running condition of the vehicle is in a predetermined slip control area which is intermediate between a fully releasing area in which the lock-up clutch should be held in a fully released state, and a fully engaging area in which the lock-up clutch should be held in a fully engaged state. These fully releasing, fully engaging and slip control areas are defined by suitable parameters (e.g., throttle valve opening angle and output shaft speed of the automatic transmission or vehicle running speed) indicative of the vehicle running condition, as indicated in FIG. 4.

It is also proposed to control the lock-up clutch in the slip control mode during deceleration or coasting of the vehicle, where the vehicle is equipped with a fuel-cut control device adapted to cut a fuel supply to the engine while the engine speed is higher than a predetermined fuel-cut speed. The slip control of the lock-up clutch during deceleration of the vehicle (hereinafter referred to as "deceleration slip control" of the lock-up clutch) is effected for the purpose of raising the engine speed by a drive force transmitted to the engine from the vehicle drive wheels through the partially engaging lock-up clutch, so that the engine speed is kept above the fuel-cut speed for a prolonged period of time, to thereby effect the fuel cut of the engine for such a prolonged period of time.

When the vehicle is running on an uphill road, a negative acceleration is given to the vehicle due to a gradient of the uphill road surface. In this case, the vehicle operator usually depresses the accelerator pedal to increase the opening angle of the throttle valve, for maintaining the vehicle running speed. If the vehicle running on such an uphill road is initiated while the lock-up clutch is in the fully engaged state or in the process of slip control, that is, while the vehicle running condition as represented by the opening angle of the throttle valve and the vehicle running speed (output shaft speed of the automatic transmission) is in the fully engaging or slip control area as indicated in FIG. 4, an increase in the throttle opening angle by further depression of the accelerator pedal causes the vehicle running condition to enter into the fully releasing area, resulting in the lock-up clutch being placed in the fully released state. To prevent a rapid rise of the engine speed due to the full releasing of the lock-up clutch in this case, it is proposed to increase the target slip speed of the lock-up clutch with an increase in the uphill road gradient, when the uphill running of the vehicle is initiated while the lock-up clutch is in the slip control process. An example of a slip control apparatus for a lock-up clutch constructed according to this proposal is disclosed in JP-A-212668.

The slip control apparatus disclosed in the above-identified publication is adapted to increase the target slip speed of the lock-up clutch during running of the vehicle on an uphill road, so that a difference between the actual slip speed of the lock-up clutch during the slip control and the actual slip speed immediately after the full releasing of the lock-up clutch is reduced even when the increase in the opening angle of the throttle valve has caused a transition from the slip control to the full releasing of the lock-up clutch. Accordingly, this arrangement is effective to minimize a discomfort to be given to the vehicle operator due to a rapid rise of the engine speed during running of the vehicle on an uphill road.

However, the slip control apparatus disclosed in the above publication is arranged such that an increase in the target slip speed of the lock-up clutch is effected immediately after the uphill road running of the vehicle is is initiated, so that the actual slip speed follows the increased target value. That is, the actual slip speed of the lock-up clutch is increased, whereby the engine speed is raised, without and before depression of the accelerator pedal. In other words, the engine speed is rapidly raised with the engine racing unexpectedly to the vehicle operator, immediately after the initiation of the uphill running of the vehicle. This problem is also encountered if the apparatus is arranged to fully release the lock-up clutch as soon as the uphill running of the vehicle during full engagement or slip control of the lock-up clutch has been detected.

Where the slip control of the lock-up clutch during uphill running of the vehicle is initiated and terminated under the same condition as during running of the vehicle on a flat road, the following problem is encountered. If, for example, the slip control apparatus is arranged such that the above-indicated deceleration slip control of the lock-up clutch is initiated when the accelerator pedal is operated toward the fully released position, the deceleration slip control is initiated each time the accelerator pedal is operated toward the fully released position shortly before the vehicle starts a turn along each curve on an uphill road, and is terminated each time the accelerator pedal is depressed shortly before the vehicle resumes a straight run on the uphill road, so that the deceleration slip control of the lock-up clutch is frequently initiated and terminated alternately. If the vehicle starts an uphill run during acceleration, the vehicle operator usually depresses the accelerator pedal to deal with a shortage of the drive force caused by an increase in the running resistance due to the uphill road gradient. In this event, the running condition of the vehicle changes from the fully engaging area or slip control area of the lock-up clutch to the fully releasing area, causing the lock-up clutch to be brought to the fully released state, with a result of an increase in the drive force, which may cause the vehicle operator to operate the accelerator pedal toward the fully released position, resulting in the full engagement or slip control of the lock-up clutch, with a result of a shortage of the drive force, which may cause the operator's depression of the accelerator pedal. Thus, the slip control apparatus arranged as described suffers from frequent alternate initiation and termination of the acceleration slip control of the lock-up clutch during acceleration of the vehicle. In either case, the frequent initiation and termination of the slip control of the lock-up clutch deteriorates the running stability of the vehicle and the driving comfort as felt by the vehicle operator.

SUMMARY OF THE INVENTION

It is therefore an object of the present invention to provide an apparatus for controlling a lock-up clutch of a motor vehicle, which is capable of minimizing repetition of alternate initiation and termination of the slip control mode of the lock-up clutch, and deterioration of driving comfort due to unexpected rapid rise of the engine speed, during uphill running of the vehicle.

The above object may be achieved according to the principle of the present invention, which provides an apparatus for controlling a lock-up clutch for direct connection of an engine and an automatic transmission of a motor vehicle, the apparatus including slip control means for selectively placing the lock-up clutch in one of a fully released state, a fully engaged state, and a partially engaged state, the apparatus comprising: (a) uphill road detecting means for detecting that a road on which the motor vehicle is running is an uphill road; and (b) slip control inhibiting means for inhibiting the slip control means from placing the lock-up clutch in the fully or partially engaged state, if the uphill road is detected by the uphill road detecting means.

In the lock-up clutch control apparatus of the present invention constructed as described above, the slip control inhibiting means commands the slip control means to inhibit full or partial encagement of the lock-up clutch if the road on which the vehicle is running is detected as an uphill road by the uphill road detecting means. According to this apparatus, the lock-up clutch is held in the fully released state once the lock-up clutch is placed in the fully released state during running of the vehicle on an uphill road.

Since the present apparatus prevents the lock-up clutch from being placed in the fully or partially engaged state throughout the uphill road running of the vehicle, the apparatus is capable of minimizing or preventing undesirable repetition of alternate full or partial engagement and full releasing of the lock-up clutch, and resulting deterioration of the driving comfort of the vehicle while the vehicle is running on the uphill road.

If the lock-up clutch is placed in the fully or partially engaged state during uphill running and during deceleration of the vehicle, the vehicle is considerably decelerated due to not only a negative acceleration caused by the uphill road surface gradient but also a negative acceleration caused by the partial engagement of the lock-up clutch. If the clutch is placed in the fully or partially engaged state during during uphill running and during acceleration of the vehicle, a drive force of the vehicle is reduced in the absence of torque amplification by a torque converter in which the lock-up clutch is incorporated. In the light of these facts, the lock-up clutch is preferably kept in the fully released state during the uphill running of the vehicle, irrespective of whether the vehicle is in acceleration or deceleration. According to the present lock-up clutch control apparatus, however, the lock-up clutch is held in the fully released state once it is placed in the fully released state during the uphill running of the vehicle. Accordingly, the driving comfort of the vehicle is further improved.

According to one preferred form of this invention, the apparatus further comprises. (c) clutch control mode determining means for determining whether the lock-up clutch is in the fully or partially engaged state or not; (d) slip control condition determining means for determining whether a predetermined condition for placing the lock-up clutch in the fully or partially engaged state is satisfied or not; and (e) slip control continuing means for commanding the slip control means to hold the lock-up clutch in the fully or partially engaged state until a negative decision is obtained by the slip control condition determining means, if an affirmative decision is obtained by the clutch control mode determining means and if the uphill road is detected by the uphill road detecting means.

In the lock-up clutch control apparatus according to the above preferred form of the invention, the clutch control mode determining means determines whether the lock-up clutch is in the fully or partially engaged state, and the slip control condition determining means determines whether the condition for placing the lock-up clutch in the fully or partially engaged state is satisfied or not. Further, the slip control continuing means is adapted to command the slip control means to hold the lock-up clutch in the fully or partially engaged state until the negative decision is obtained by the slip control condition determining means, if the affirmative decision is obtained by the uphill road detecting means and if the affirmative decision is obtained by the clutch control mode determining means. In the present form of the apparatus, the lock-up clutch is held in the fully or partially engaged state by the slip control continuing means until the negative decision is obtained by the slip control condition determining means, as long as the full or partial engagement of the lock-up clutch is detected by the clutch control mode determining means during uphill running of the vehicle. If the uphill running of the vehicle is initiated during the slip control of the lock-up clutch, the lock-up clutch is held in the fully or partially engaged until the predetermined condition for placing the lock-up clutch in the fully or partially engaged state is lost. After the slip control condition is lost, the slip control inhibiting means inhibits the slip control means from placing the lock-up clutch in the fully or partially engaged state. The present arrangement is effective to minimize or prevent repetition of alternate full releasing and full or partial engagement of the lock-up clutch, termination of the full or partial engagement of the clutch, and unexpected increase of the engine speed due to the termination, which would deteriorate the driving comfort of the vehicle.

BRIEF DESCRIPTION OF THE DRAWINGS

The above and optional objects, features, advantages and technical and industrial significance of the present application will be better understood by reading the following detailed description of a presently preferred embodiment of this invention, when considered in connection with the accompanying drawings, in which:

FIG. 2 is a table indicating a relationship between the operating positions of an automatic transmission connected to the torque converter and the respective combinations of the operating states of solenoid-operated valves of the slip control apparatus;

FIG. 9 is a flow chart illustrating a control routine executed by the transmission controller of FIG. 3 to control the lock-up clutch; and FIG. 10 is a time chart indicating changes of the vehicle speed and other parameters when the control routine illustrated in the flow chart of FIG. 9 is executed.

DETAILED DESCRIPTION OF THE PREFERRED EMBODIMENT

Figure 1:
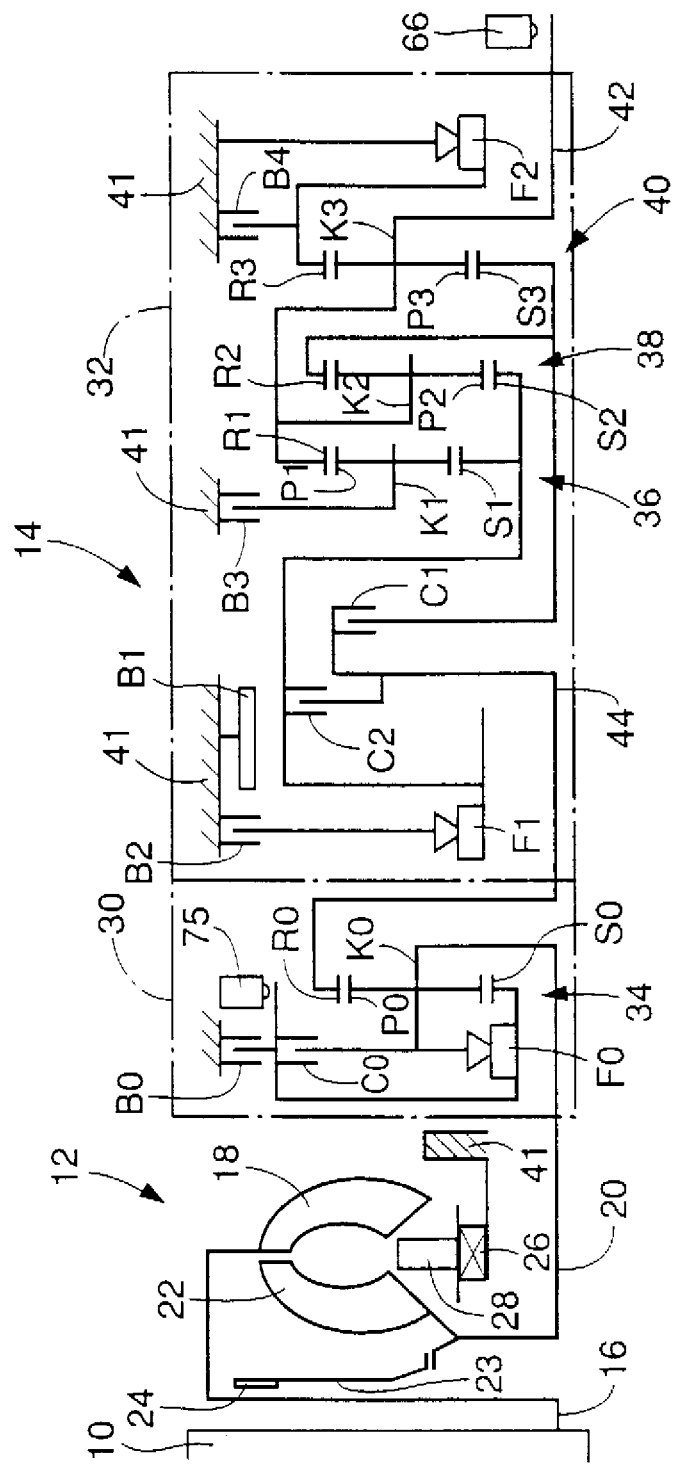
FIG. 1 is a schematic view illustrating a part of a power transmitting system of a motor vehicle, which incorporates a torque converter having a lock-up clutch to be controlled by a slip control apparatus constructed according to one embodiment of the present invention.

Referring first to the schematic view of FIG. 1, there is shown a part of a power transmitting system of a motor vehicle, wherein power generated by an engine 10 is transmitted to an automatic transmission 14 through a torque converter 12 equipped with a lock-up clutch 24, and the power is transferred to drive wheels of the vehicle through a differential gear and a drive axle. The lock-up clutch 24 is controlled by a slip control apparatus constructed according to one embodiment of the present invention, as described below.

The torque converter 12 includes: a pump impeller 18 connected to a crankshaft 16 of the engine 10; a turbine runner 22 fixed to an input shaft of the automatic transmission 14 and rotatable by the pump impeller 18; a stator 28 whose rotation in one direction is inhibited by a one-way clutch 26; and the above-indicated lock-up clutch 24 connected to the input shaft 20 through the turbine runner 22. The pump impeller 18 includes a radially outer portion which is U-shaped in cross section, and a plurality of curved vanes which are arranged in the circumferential direction and formed so as to cause a flow of a working oil, which flow includes a component moving toward the turbine runner 22 on the side of the engine 10. The turbine runner 22 includes a plurality of curved vanes opposed to the vanes of the pump impeller 18. In operation of the torque converter 12, the turbine runner 22 is rotated by the oil flow from the vanes of the pump impeller 18 rotated by the engine 10. The lock-up clutch has a piston 23 which engages a hub of the turbine runner 22 such that the piston 23 is axially slidable relative to and rotatable with the turbine runner 22.

The automatic transmission 14 includes a first transmission unit 30 having a high-gear position and a low-gear position, and a second transmission unit 32 having a rear-drive position and four forward-drive positions. The first transmission unit 30 has a high-low planetary gear set 34, a clutch C0, a one-way clutch F0, and a brake B0. The high-low planetary gear set 34 includes a sun gear S0, a ring gear R0, a carrier K0, and a planetary gear P0 which is rotatably supported by the carrier K0 and which meshes with the sun gear S0 and the ring gear R0. The clutch C0 and the one-way clutch F0 are provided between the sun gear S0 and the carrier K0. The brake B0 is provided between the sun gear S0 and a housing 41 of the automatic transmission 14.

The second transmission unit 32 includes a first planetary gear set 36, a second planetary gear set 38, and a third planetary gear set 40. The first planetary gear set 36 includes a sung gear S1, a ring gear R1, a carrier K1, and a planetary gear P1 which is rotatably supported by the carrier K1 and which meshes with the sun and ring gears S1, R1. The second planetary gear set 38 includes a sun gear S2, a ring gear R2, a carrier K2, and a planetary gear P2 which is rotatably supported by the carrier K2 and which meshes with the sun and ring gears S2, R2. The third planetary gear set 40 includes a sun gear S3, a ring gear R3, a carrier K3, and a planetary gear P3 which is rotatably supported by the carrier K3 and which meshes with the sun and ring gears S3, R3.

The sun gear S1 and the sun gear S2 are integrally connected to each other, while the ring gear R1, carrier K2 and carrier K3 are integrally connected to each other. The carrier K3 of the third planetary gear set 40 is connected to an output shaft 42 of the automatic transmission 14. Further, the ring gear R2 and the sun gear S3 are integrally connected to each other, and a clutch C1 is provided between the series connection of the ring and sun gears R2, S3 and an intermediate shaft 44 of the automatic transmission 14. A clutch C2 is provided between the series connection of the sun gears S1, S2 and the intermediate shaft 44. A band-type brake B1 is fixed to the housing 41, for inhibiting the rotation of the sun gears S1, S2, while a one-way clutch F1 and a brake B2 are provided in series connection with each other between the series connection of the sun gears S1, S2 and the housing 41. The one-way clutch F1 is adapted to be engaged when the sun gears S1, S2 are rotated in a direction opposite to the direction of rotation of the input shaft 20.

A brake B3 is provided between the carrier K1 and the housing 41. A brake B4 and a one-way clutch clutch F2 are provided in parallel between the ring gear R3 and the housing 41. The one-way clutch F2 is adapted to be engaged when the ring gear R3 is rotated in the reverse direction.

The automatic transmission 14 constructed as described above has one rear-drive position and five forward-drive positions which have different speed ratios I (the rotating speed of the input shaft 20 divided by the rotating speed of the output shaft 42), as indicated in the table of FIG. 2, wherein those positions are indicated as "R" (reverse), "1st" (first-speed), "2nd" (second-speed), "3rd" (third-speed), "4th" (fourth-speed), and "5th" (fifth speed). In FIG. 2, "o" indicates the energized state of solenoid-operated valves S1, S2, S3, S4 and linear solenoid valves SLU, SLT and SLN or the engaged state of the clutches C0–C2 and brakes B0–B4, while "x" indicates the de-energized state of the valves or the released state of the clutches and brakes. It will be understood from the table of FIG. 2 that the brake B3 is engaged when the automatic transmission 14 is shifted from the first-speed position "1st" to the second-speed position "2nd", and is released when the transmission 14 is shifted from the second-speed position to the third-speed position "3rd". Further, the brake B2 is engaged when the transmission 14 is shifted from the second-speed position to the third-speed position. The speed ratios I of the five forward-drive positions "1st", "2nd", "3rd", "4th" and "5th" decrease in this order of description.

It is to be noted that the lower halves of the torque converter 12 and the automatic transmission 14 are not shown in FIG. 1 in the interest of simplification, since these elements 12, 14 are symmetrical with respect to their axes of rotation.

Figure 3:
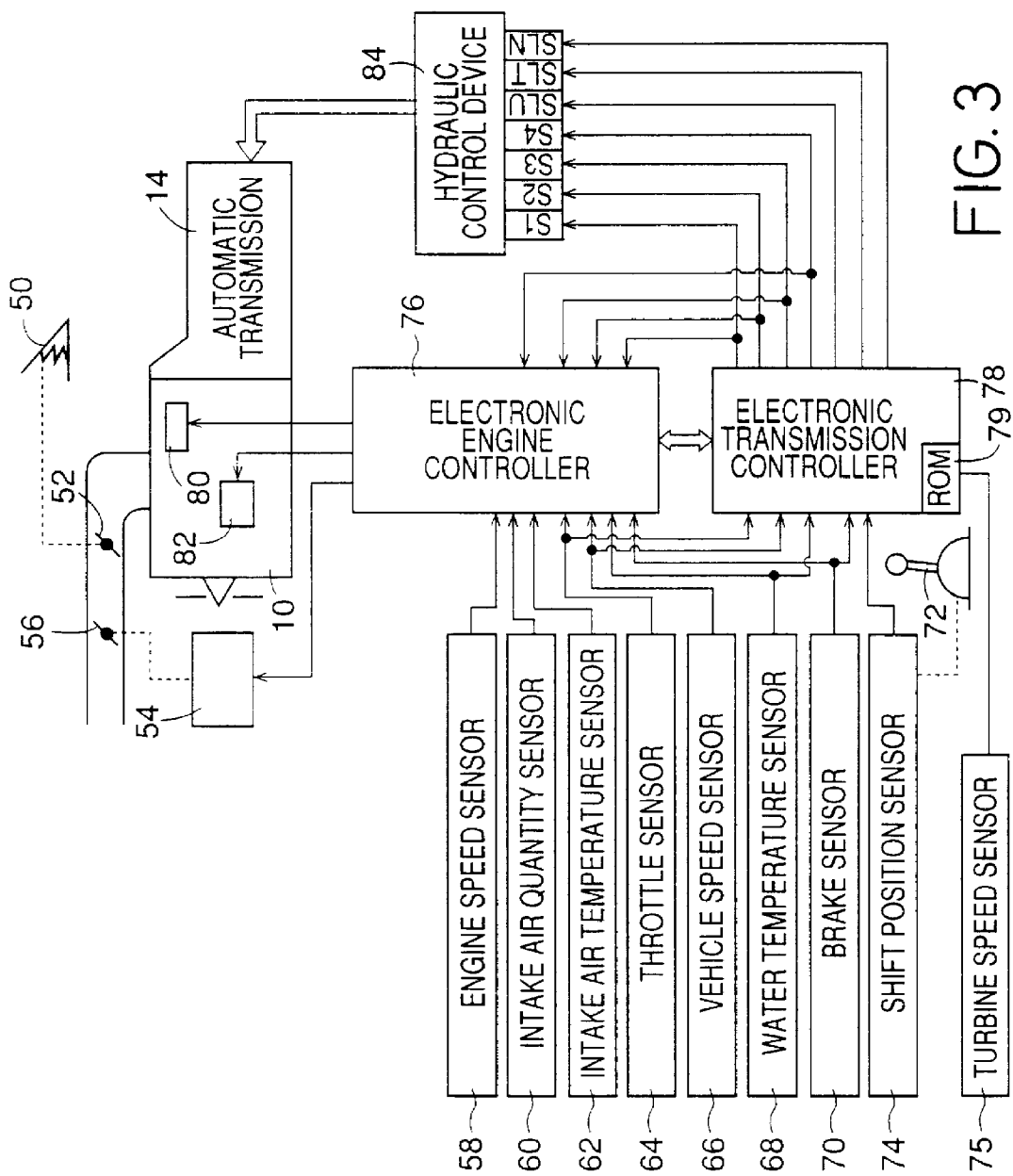
FIG. 3 is a block diagram showing a control system for the motor vehicle, which includes a transmission controller which constitutes a major portion of the slip control apparatus for the lock-up clutch.

Referring next to FIG. 3, there are shown a first throttle valve 52 and a second throttle valve 56 which are disposed in an intake pipe of the engine 10. The first throttle valve 52 is operated by an accelerator pedal 50, while the second throttle valve 56 is operated by a throttle actuator 54. The engine 10 is controlled by an electronic engine controller 76, while the automatic transmission 14 and the lock-up clutch 24 are controlled by an electronic transmission controller 78. These controllers 76, 78 are adapted to receive output signals of various sensors including: an engine speed sensor 58 for detecting a speed Ne of the engine 10, namely, the rotating speed of the pump impeller 18; an intake air quantity sensor 60 for detecting a quantity Q of an intake air sucked into the engine 10 through the intake pipe; an intake air temperature sensor 62 for detecting a temperature THa of the intake air; a throttle sensor 64 for detecting an opening angle TA of the first throttle valve 51; a vehicle speed sensor 66 for detecting a rotating speed No of the output shaft 42 of the automatic transmission 14 for calculating a running speed V of the motor vehicle; a water temperature sensor 68 for detecting a temperature THw of a coolant water of the engine 10; a brake sensor 70 for detecting an operating state BK of a brake pedal; and a shift position sensor 74 for detecting a currently selected operating position Psh of a shift lever 72. The output signals of those sensors are applied directly or indirectly to the engine and transmission controllers 76, 78. The transmission controller 78 is adapted to receive also an output signal of a turbine speed sensor 75 indicative of a rotating speed $N_T$ of the turbine runner 22. The two controllers 76, 78 are connected to each other by a communication interface, for applying the necessary signals to each other.

The engine controller 76 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the engine 10, more specifically, for effecting a fuel injection control for controlling a fuel injection valve 80 so as to optimize the combustion condition of the engine 10, an ignition control for controlling an igniter 82 so as to optimize the ignition timing, an engine idling speed control for controlling a suitable by-pass valve to control the idling speed of the engine 10, a traction control for controlling the second throttle valve 56 via the throttle actuator 54 so as to control the traction force of the vehicle drive wheels while preventing slipping of the drive wheels on the road surface, and a fuel cut control for holding the fuel injection valve 80 closed to cut a fuel supply to the engine 10 while the engine speed Ne is higher than a predetermined fuel-cut threshold level $N_{CUT}$ during coasting of the vehicle, so that the fuel economy of the vehicle is improved. The vehicle is considered to be in a coasting state while the first throttle valve 52 is fully closed. The closure of the first throttle valve 52 may be detected by an idling position switch incorporated in the throttle sensor 64.

The transmission controller 78 is also comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 24 via a hydraulic control device 84 by controlling the solenoid-operated valves S1, S2, S3 and S4 and the linear solenoid valves SLU, SLN and SLT. For instance, the transmission controller 78 is adapted to control: the linear solenoid valve SLT to produce an output pressure $P_{SLT}$ corresponding to the opening angle TA of the first throttle valve 52; the linear solenoid valve SLN to regulate an accumulator back pressure; and the linear solenoid valve SLU for fully engaging the lock-up clutch 24 or controlling an actual slip speed $N_{SLP}$ of the lock-up clutch 24. The slip speed $N_{SLP}$ is equal to a difference (Ne—$N_T$) between the speed Ne of the engine 10 and the speed $N_T$ of the turbine runner 22. The transmission controller 78 is adapted to select one of the operating positions of the automatic transmission 14 and the engaging state (fully or partially engaging state) of the lock-up clutch 24, on the basis of the opening angle TA of the first throttle valve 52 and the vehicle speed V (calculated from the detected output shaft speed No), and according to predetermined shift patterns (shift boundary lines) stored in the ROM. The transmission controller 78 controls the solenoid-operated valves S1, S2, S3 to as to establish the selected operating position of the automatic transmission 14 and the selected engaging state of the lock-up clutch 24, and de-energize the solenoid-operated valve S4 when engine brake is applied to the vehicle.

Figure 4:
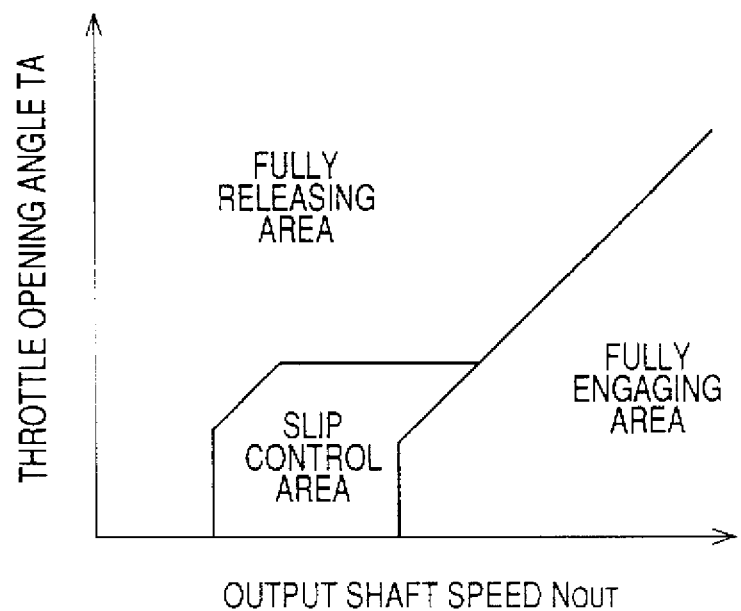
FIG. 4 is a view indicating boundaries defining different control areas of the lock-up clutch in relation to the running condition of the vehicle, which boundaries are stored in the slip control apparatus shown in FIG. 3.

The transmission controller 78 controls the lock-up clutch 24 so as to be fully released while the automatic transmission 14 is placed in the first-speed or second-speed position "1st" or "2nd", and so as to be fully released, partially engaged or fully engaged while the automatic transmission 14 is placed in the third-speed or fourth-speed position "3rd" or "4th". For controlling the lock-up clutch 24 differently depending upon the running condition of the vehicle with the transmission 14 placed in the third- or fourth-speed position, predetermined boundaries defining three different control areas as indicated in FIG. 4 are stored in the ROM 79 (indicated in FIG. 3) of the transmission controller 78. For instance, the boundaries are relationships between the opening angle TA of the first throttle valve 52 and the rotating speed No of the output shaft 42 of the transmission 14 (vehicle running speed V). Described more specifically, these boundaries define a fully releasing area in which the lock-up clutch 24 should be fully released, a fully engaging area in which the lock-up clutch 24 should be fully engaged, and a slip control area in which the slip speed $N_{SLIP}$ of the lock-up clutch 24 should be suitably controlled, that is, the slip control of the lock-up clutch 24 is executed by the transmission controller 78. Depending upon the currently detected throttle opening TA and the output shaft speed No, one of the three control areas is determined or selected by the CPU of the controller 78, according to the boundaries stored in the ROM 79.

When the vehicle running condition (TA and No) is in the slip control area of FIG. 4, for example, the lock-up clutch 24 is controlled to be held in a partially slipping state for transmitting power of the engine 10 to the automatic transmission 14 while absorbing a torque variation of the engine 10 and minimizing power loss at the torque converter 12, so as to maximize the fuel economy of the vehicle without deteriorating the drivability of the vehicle. The slip speed $N_{SLP}$ of the lock-up clutch 24 is also controlled while the vehicle is coasting or decelerating with the throttle valve 52 placed in the idling position. This slip control during deceleration of the vehicle is effected to increase an effect of the fuel cut control of the engine 10 with the engine speed Ne held above the predetermined fuel-cut threshold level $N_{CUT}$. In this case, however, the slip control area is determined on the basis of only the vehicle speed V (output shaft speed No), since the throttle opening angle TA is zero during the coasting of the vehicle.

If the CPU of the controller 78 determines that the vehicle running condition falls in the slip control area, a suitable slip control routine is executed to calculate the actual slip speed $N_{SLP}$ of the lock-up clutch 24, and calculate a desired SLIP CONTROL current $I_{SLU}$ to be applied to the linear solenoid valve SLU so as to eliminate a control error $\Delta E = N_{SLP} - TN_{SLP}$, which error is equal to the actual slip speed $TN_{SLP}$ minus a predetermined target slip speed $TN_{SLP}$. The desired SLIP CONTROL current $I_{SLU}$ is expressed as a desired duty ratio $D_{SLU}$ (%) of the linear solenoid valve SLU, which may be calculated according to the following equation (1) (which has been described above):

$$D_{SLU} = DFWD + DFB \qquad (1)$$

The first term DFWD of the right member of the above equation (1) is a feed-forward control value which varies as a function of the output torque of the engine 10, for example. The second term DFB is a feedback control value for eliminating or zeroing an error $\Delta E = N_{SLP} - N_{SLP}$, namely, a difference $\Delta E$ between the actual slip speed $N_{SLP}$ and the target slip speed $TN_{SLP}$. The feed-forward and feedback control values DFWD and DFB are expressed as percent values (%) of the duty ratio. The feedback control value DFB consists of a proportional value, a differential or derivative value and an integral value of the control error $\Delta E$. The feedback control value DFB is calculated according to the following equation (2):

$$DFB = Kp[\Delta E + (1/T_I)S\Delta E dt + T_d(d\Delta E/dt)] \qquad (2)$$

In the above equation (2), Kp represents a proportional gain, and $T_I$ and $T_D$ represent integration and differentiation times, respectively.

With the duty ratio $D_{SLU}$ calculated as described above, a SLIP CONTROL pilot pressure $P_{SLU}$ to be produced by the linear solenoid valve SLU is accordingly adjusted so as to control the lock-up clutch 24 in the slip control mode.

Figure 5:
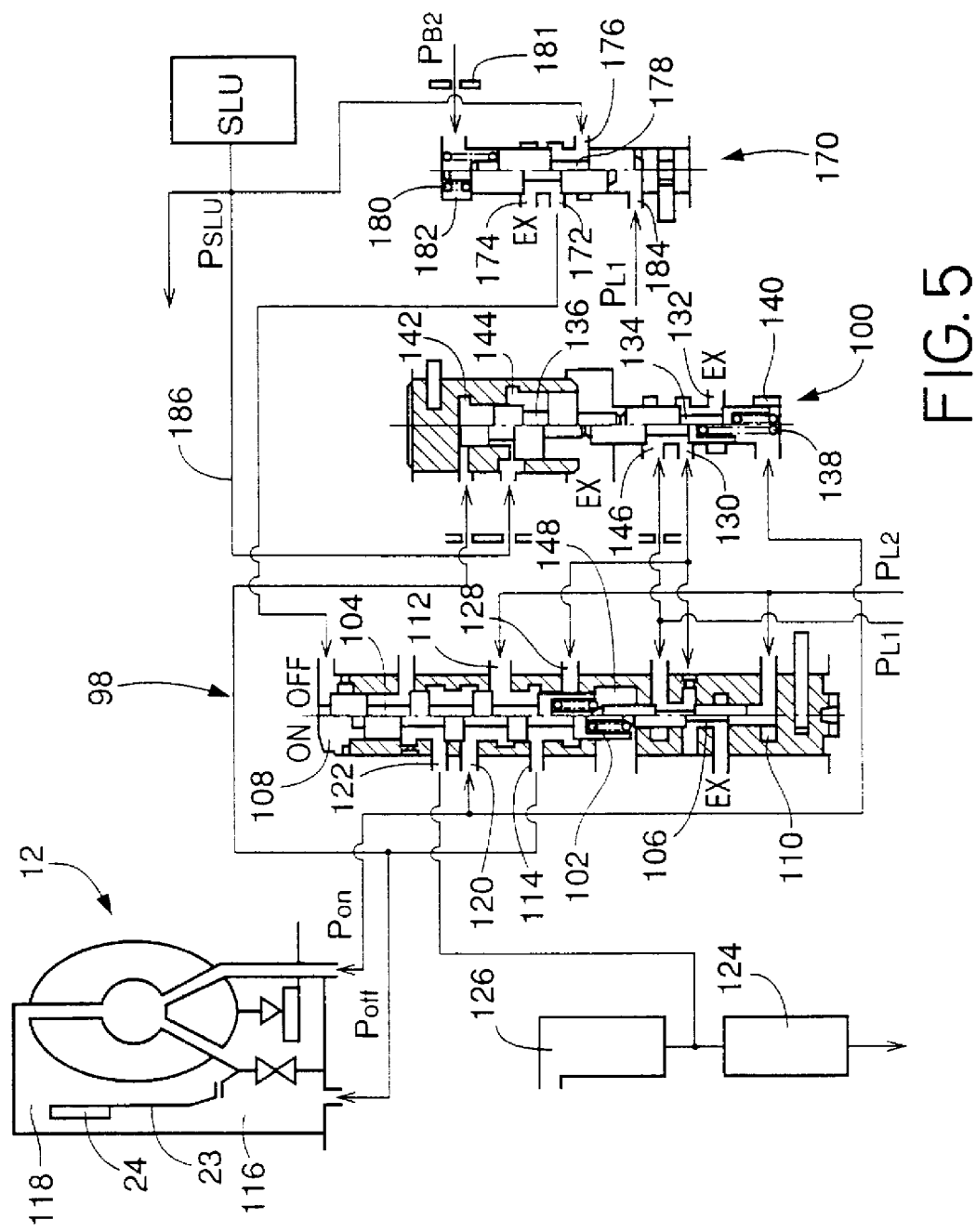
FIG. 5 is a view illustrating a part of a hydraulic control device shown in FIG. 3, which incorporates a circuit for controlling the lock-up clutch.
Figure 6:
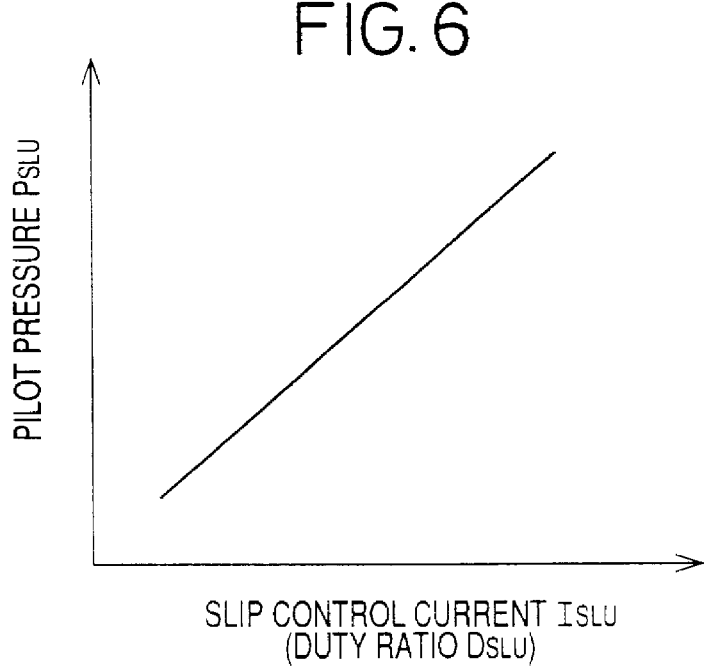
FIG. 6 is a graph indicating an output characteristic of a linear solenoid valve provided in the lock-up clutch control circuit of FIG. 5.

Referring to FIG. 5, there is shown a part of the hydraulic control device 84 which includes the linear solenoid valve SLU which produces the pilot $P_{SLU}$. The linear solenoid valve SLU is a pressure reducing valve whose output pressure $P_{SLU}$ (pilot pressure) increases with an increase in the SLIP CONTROL current $I_{SLU}$ as indicated in the graph of FIG. 6, The duty ratio $D_{SLU}$ of the SLIP CONTROL current $I_{SLU}$ is controlled by the transmission controller 78. The SLIP CONTROL pilot pressure $P_{SLU}$ produced by the linear solenoid valve SLU is applied to a lock-up clutch relay valve 98 and a lock-up clutch control valve 100, which are also included in the hydraulic control device 84.

The lock-up clutch relay valve 98 has: a first spool 104 and a second spool 106; a spring 102 disposed between the first and second spools 104, 106; an oil chamber 108 provided to receive the pilot pressure $P_{SLU}$ for biasing the first and second spools 104, 106 toward an "ON" position corresponding to the fully engaged state of the lock-up clutch 24; and an oil chamber 110 provided to receive a second line pressure $P_{L2}$ for biasing the first and second spools 102, 104 toward an "OFF" position corresponding to the fully released state of the lock-up clutch 24.

When the first spool 104 is placed in the OFF position, the second line pressure $P_{L2}$ applied to an input port 112 is applied to a releasing oil chamber 116 of the torque converter 12 through a releasing port 114, while the working oil is fed out of an engaging oil chamber 118 of the torque converter 12 through a drain port 122 and discharged into a cooler by-pass valve 124 or an oil cooler 126, whereby an engaging pressure of the lock-up clutch 24 is lowered. The engaging pressure of the lock-up clutch 24 is equal to a difference between the pressures in the pressures in the engaging and releasing oil chambers 118, 116, more specifically, the pressure $P_{on}$ in the engaging oil chamber 118 minus the pressure $P_{off}$ in the releasing oil chamber 116. When the first spool 104 is placed in the ON position, on the other hand, the second line pressure $P_{L2}$ applied to the input port 112 is applied to the engaging oil chamber 118 through an engaging port 120, while the oil is discharged from the releasing oil chamber 116 through a drain port 128 of the relay valve 98 and through a control port 130 and a drain port 132 of the lock-up clutch control valve 100, whereby the engaging pressure ($P_{on} - P_{off}$) of the lock-up clutch 24 is raised.

When the SLIP CONTROL pilot pressure $P_{SLU}$ is lower than a predetermined threshold $\beta$, the first spool 104 is placed in the OFF position (indicated on the right side of the centerline of the valve 98 in FIG. 5) by a thrust force based on the biasing force of the spring 102 and the second line pressure $P_{L2}$, so that the lock-up clutch is fully released. When the pilot pressure $P_{SLU}$ is higher than a predetermined threshold $\alpha$, the first spool 104 is placed in the ON position (indicated on the left side of the centerline of the valve 98 in FIG. 5) by a thrust force based on the pilot pressure $P_{SLU}$, so that the lock-up clutch 24 is fully or partially engaged. That is, the pressure-receiving areas of the first and second spools 104, 106 and the biasing force of the spring 102 are determined so that the first spool 104 is placed in the OFF and ON positions when the pilot pressure $P_{SLU}$ is lower and higher than the threshold values $\beta$ and $\alpha$, respectively. The amount of slip of the lock-up clutch 24 with the spool 104 or relay valve 98 being placed in the ON position is controlled by the lock-up clutch control valve 100 which is operated depending upon the pilot pressure $P_{SLU}$.

The lock-up clutch control valve 100 is provided to fully engage the lock-up clutch 24 or control the slip amount $N_{SLIP}$ of the lock-up clutch 24 according to the received pilot pressure $P_{SLU}$ when the lock-up clutch relay valve 98 is placed in the ON position. The control valve 100 has: a spool 134; a plunger 136 in abutting contact with the spool 134, for biasing the spool 134 toward a discharge position thereof (indicated on the right side of the centerline of the valve 100 in FIG. 5); a spring 138 for biasing the spool 134 toward a supply position thereof (indicated on the left side of the centerline of the valve 100 in FIG. 5); an oil chamber 140 in which the spring 138 is accommodated and which is provided to receive the pressure $P_{on}$ in the engaging oil chamber 118 of the torque converter 12, for biasing the spool 134 toward the supply position; an oil chamber 142 which is partially defined by one end of the plunger 136 and which is provided to receive the pressure $P_{off}$ in the releasing oil chamber 116 of the torque converter 12, for biasing the spool 134 toward the discharge position; and an oil chamber 144 provided in an axially intermediate portion of the plunger 136, to receive the SLIP CONTROL pilot pressure $P_{SLU}$ from the linear solenoid valve SLU.

When the spool 134 is placed in the discharge position, a control port 130 and a drain port 132 of the control valve 100 communicate with each other, resulting in an increase in the engaging pressure ($P_{on} - P_{off}$) of the lock-up clutch 24, causing an increase in the engaging torque of the lock-up clutch 24. When the spool 134 is placed in the supply position, the control port 130 is brought into communication with a supply port 146 by a first line pressure $P_{L1}$ applied thereto, so that the first line pressure $P_{L1}$ is applied to the releasing oil chamber 116, whereby the engaging pressure of the lock-up clutch 24 is lowered, resulting in a decrease in the engaging torque of the lock-up clutch 24.

Figure 7:
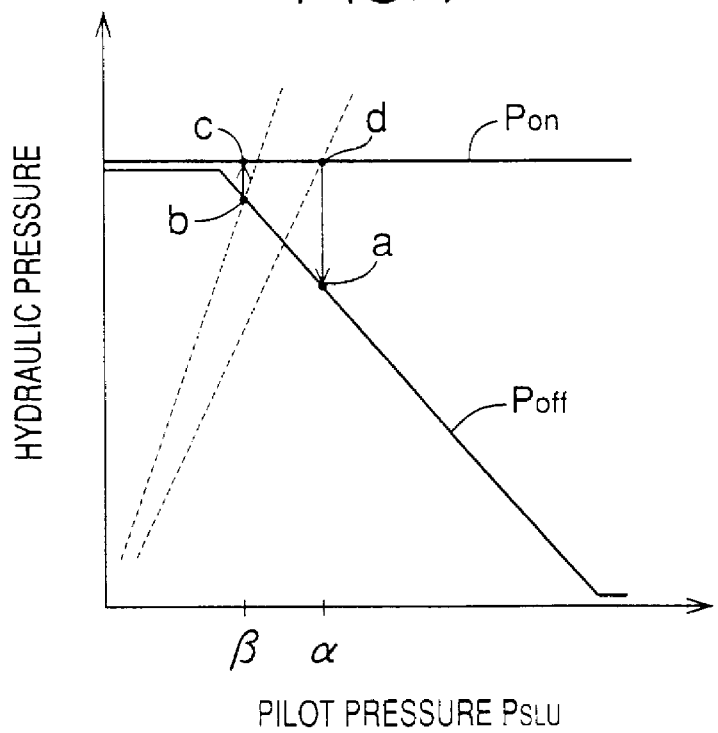
FIG. 7 is a graph indicating a relationship between a pilot pressure $P_{SLU}$ produced by a linear solenoid valve in a hydraulic control device of FIG. 5, and hydraulic pressures Pon and Poff in engaging and releasing oil chambers of the lock-up clutch.

To fully release the lock-up clutch 24, the transmission controller 78 controls the linear solenoid valve SLU so as to reduce the pilot pressure $P_{SLU}$ to be lower than the threshold β. To fully engage the lock-up clutch 24, the transmission controller 78 controls the linear solenoid valve SLU so as to increase the pilot pressure $P_{SLU}$ to the highest level. The amount of slip of the lock-up clutch 24 is controlled by controlling the pilot pressure $P_{SLU}$ between the threshold level β and the highest level indicated above. Namely, the lock-up clutch control valve 100 is adapted to change the pressures $P_{on}$ and $P_{off}$ in the engaging and releasing oil chambers 118, 116 of the torque converter 12, according to the pilot pressure $P_{SLU}$ received from the linear solenoid valve SLU, as indicated in the graph of FIG. 7, so that the engaging torque and the resulting slip amount of the lock-up clutch 24 are controlled according to the pressure difference $P_{on}$-$P_{off}$, which is referred to as the "engaging pressure" of the lock-up clutch 24. In other words, the engaging torque and slip amount of the lock-up clutch 24 vary as a function of the pressure difference $P_{on}$-$P_{off}$, which varies with the SLIP CONTROL pilot pressure $P_{SLU}$.

In the graph of FIG. 7, a left-hand side one of two dashed lines indicates a hydraulic characteristic of the lock-up clutch relay valve 98 required for the first spool 104 to be shifted from the ON position to the OFF position to fully release the lock-up clutch 24, while the other right-hand side dashed line indicates a hydraulic characteristic of the relay valve 98 required for the first spool 104 to be shifted from the OFF position to the ON position to fully or partially engage the lock-up clutch 24. The gradients of these dashed lines are determined by the pressure-receiving areas of the first and second spools 104, 106, the pressure inputs to the relay valve 98 and the characteristic of the spring 102.

The oil chamber 108 of the lock-up clutch relay valve 98 is connected to a solenoid relay valve 170. This solenoid relay valve 170 has: an output port 172 connected to the oil chamber 108 of the relay valve 98; a drain port 174; a an input port 176 provided to receive the SLIP CONTROL pilot pressure $P_{SLU}$ from the linear solenoid valve SLU; a spool 178 having a first position for fluid communication between the output and drain ports 172, 174, and a second position for fluid communication between the output and input ports 172, 176; a spring 180 for biasing the spool 178 toward the second position; an oil chamber 182 in which the spring 180 is accommodated and which is provided to receive through an orifice 181 a brake B2 pressure in the brake B2 of the transmission 14, for biasing the spool 178 toward the second position; and an oil chamber 184 provided to receive the first line pressure $P_{L1}$ for biasing the spool 178 toward the first position. The brake 32 pressure in the brake B2 is generated when the automatic transmission 14 is placed in the third- fourth- or fifth-speed position "3rd", "4th" or "5th". In this arrangement, the SLIP CONTROL pilot pressure $P_{SLU}$ is applied to the oil chamber 108 of the lock-up clutch relay valve 98, only when the automatic transmission 14 is placed in the third-, fourth- or fifth-speed position, and the first spool 104 is moved to the ON position according to the pilot pressure $P_{SLU}$. Since the second line pressure $P_{L2}$ is obtained by lowering the first line pressure $P_{L1}$, the second line pressure $P_{L2}$ is always lower than the first line pressure $P_{L1}$.

The linear solenoid valve SLU is connected to the oil chamber 144 of the lock-up clutch control valve 100 through an oil passage 186, so that the pilot pressure $P_{SLU}$ may be applied directly to the oil chamber 144 of the control valve 100 without passing through the solenoid relay valve 170. This oil passage 186 is provided to operate the control valve 100 by application of the pilot pressure $P_{SLU}$ thereto, for the purpose of detecting possible abnormality that the lock-up clutch relay valve 98 is kept in the ON position for some reason or other.

Referring next to the block diagram of FIG. 8, there will be described the functions of various functional means provided in the slip control apparatus constructed according to the present embodiment of the invention, which apparatus includes the electronic transmission controller 78. That is, the slip control apparatus incorporates slip control means 188, uphill road detecting means 190, slip control inhibiting means 192, clutch control mode determining means 194, slip control condition determining means 196, and slip control continuing means 198.

Figure 8:
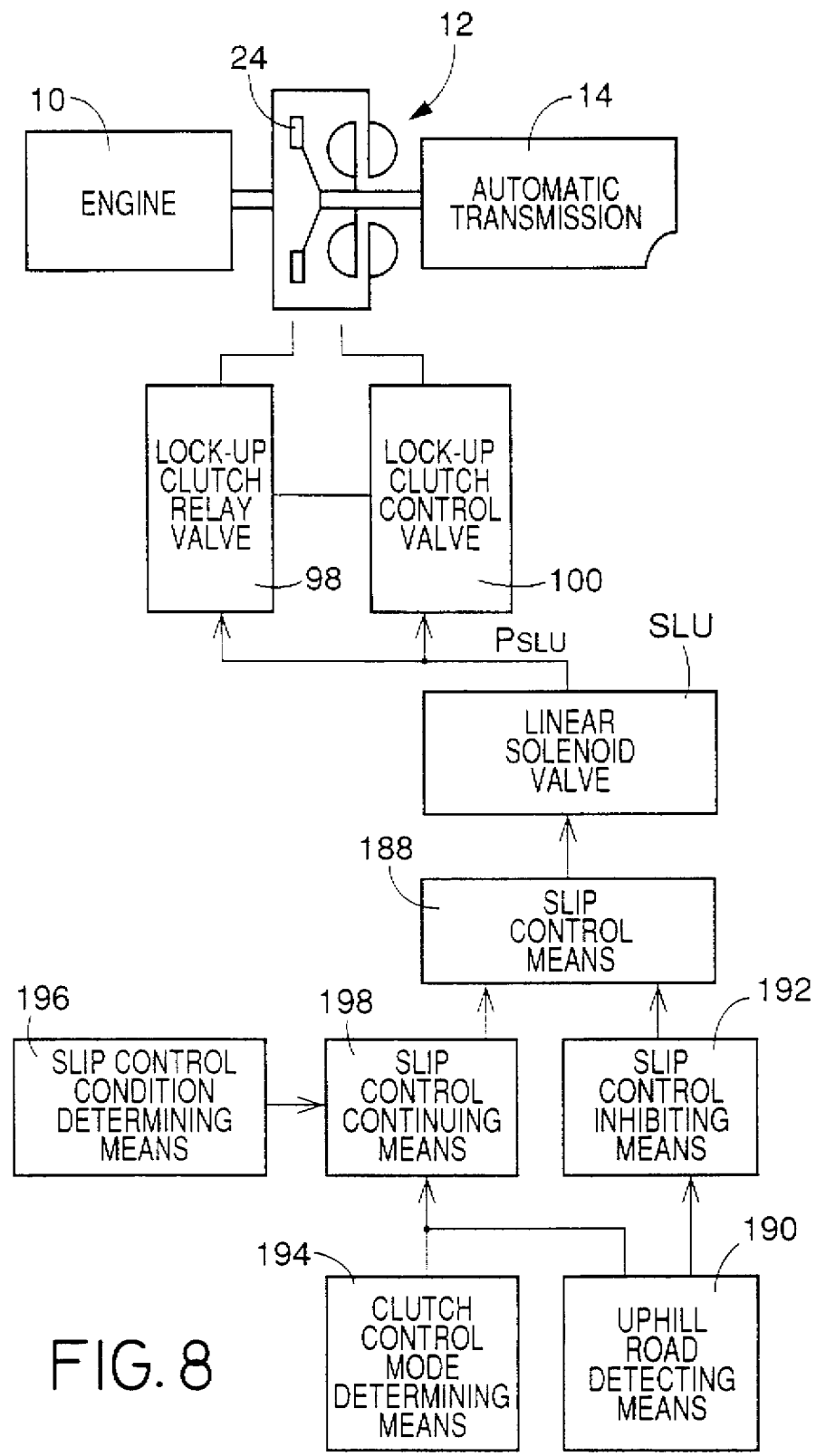
FIG. 8 is a block diagram illustrating the functions of various functional means of the transmission controller of FIG. 3.

As shown in FIG. 8, the lock-up clutch 24 is controlled by the lock-up clutch relay valve 98 and the lock-up clutch control valve 100, which in turn are controlled by the linear solenoid valve SLU, which in turn is controlled by the slip control means 188. As described above, the lock-up clutch relay valve 98 has the OFF and ON positions for fully releasing and engaging the lock-up clutch 24. The lock-up clutch control valve 100 controls the amount of the fluid discharged from the lock-up clutch relay valve 98, to thereby regulate the amount of slip or slip speed of the lock-up clutch 24. The linear solenoid valve SLU functions as a pilot pressure generating valve adapted to generate the SLIP CONTROL pilot pressure $P_{SLU}$ for controlling the lock-up clutch control valve 100 such that the amount of slip of the lock-up clutch 24 is reduced with an increase in the pilot pressure $P_{SLU}$, with the lock-up clutch relay valve 98 placed in the ON position.

When the vehicle running condition is determined to fall in the slip control area explained above by reference to FIG. 4, the slip control means 188 applies to SLIP CONTROL current $I_{SLU}$ to the linear solenoid valve SLU for operating this valve SLU at the duty ratio $D_{SLU}$ calculated according to the above equation (1), so that the detected actual slip speed $N_{SLP}$=Ne−$N_T$ of the lock-up clutch 24 coincides with the target slip speed $TN_{SLP}$.

The uphill road detecting means 190 is adapted to detect that the road surface on which the vehicle is running an uphill road surface whose gradient is higher than a predetermined threshold. This detection is effected by determining whether an actual acceleration rate MOBGBW of the vehicle is lower than a reference acceleration rate MOBGBU. Namely, the road surface is determined to be an uphill road surface when the actual acceleration rate MOBGBW is lower than the reference acceleration rate MOBGBU. The actual acceleration rate MOBGBW is a rate of change of the vehicle running speed V, that is, dNout/dt. On the other hand, the reference acceleration rate MOBGBU is calculated according to a predetermined data map, on the basis of the throttle opening angle TA detected by the throttle sensor 64, the vehicle running speed V (output shaft speed Nout of the automatic transmission 14) detected by the vehicle speed sensor 66, and the currently established position of the automatic transmission 14.

The slip control inhibiting means 192 is adapted to inhibit the slip control means 188 from placing the lock-up clutch 24 in the fully or partially engaged state as long as the vehicle is running on an uphill road surface, namely, as long as an uphill road is detected by the uphill road detecting means 190, while the lock-up clutch 24 is placed in the fully released state. In other words, the slip control inhibiting means 192 is adapted to inhibit the full engagement or slip control of the lock-up clutch 24 while the vehicle is running on an uphill road with the lock-up clutch placed in the fully released state.

The clutch control mode determining means 194 is adapted to determine whether the lock-up clutch 24 is placed in the fully engaged state or in the partially engaged state (in the slip control mode). This determination is effected on the basis of the duty ratio $D_{SLU}$ of the linear solenoid valve SLU or the output torque of the engine 10.

The slip control condition determining means 196 is adapted to determine whether the vehicle is in a condition for fully engaging the lock-up clutch 24 or initiating the slip control of the lock-up clutch 24. For instance, this determination is effected by checking if the vehicle condition as defined by the vehicle running speed V and the throttle opening angle TA is in the fully engaging area or slip control area indicated in the graph of FIG. 4.

The slip control continuing means 198 is adapted to command the slip control means 188 to hold the lock-up clutch 24 in the fully engaged state or partially engaged state until a negative decision is obtained by the slip control condition determining means 196 (until the vehicle condition falls in the fully releasing area), while an affirmative decision is obtained by the slip control mode determining means (while the lock-up clutch 24 is in the fully or partially engaged state) and while the road surface is detected as an uphill road surface by the uphill road detecting means 192.

Referring to the flow chart of FIG. 9 and the time chart of FIG. 10, there will be described an operation of the present slip control apparatus a major portion of which is constituted by the transmission controller 78. The flow chart of FIG. 9 indicates a control routine executed by the transmission controller 78 to control the lock-up clutch 24 according to the principle of the invention. In the time chart of FIG. 10, solid lines indicate changes of the vehicle speed V and other parameters in the case where the acceleration slip control of the lock-up clutch 24 (slip control of the clutch 24 in the slip control mode during acceleration of the vehicle) is inhibited, while one-dot chain lines indicate changes of the parameters in the case where the deceleration slip control of the lock-up clutch 24 (slip control of the clutch 24 in the slip control mode during deceleration of the vehicle) is inhibited. The inhibition of the acceleration slip control of the lock-up clutch 24 will be first described by reference to the flow chart of FIG. 9.

The control routine of FIG. 9 is initiated with step S1 to calculate the reference acceleration rate MOBGBU on the basis of the detected throttle opening angle TA and vehicle speed V and the currently established position of the automatic transmission 14. Step S1 is followed by step S2 to calculate the actual acceleration rate MOBGBW on the basis of the rate of change of the vehicle speed V. Then, the control flow goes to step S3, to determine whether the reference acceleration rate MOBGBU is higher than the actual acceleration rate MOBGBW, that is, to determine whether the road surface is an uphill road surface. Steps S1–S3 correspond to the uphill road detecting means 190. In the example of FIG. 10, the vehicle is running on a flat road surface at a point of time t0. In this case, therefore, a negative decision (NO) is obtained in step S3, and the control flow goes to step S4 corresponding to the slip control condition determining means 196, to determine whether the vehicle running condition is in the slip control area indicated in the graph of FIG. 4, that is, the condition for initiating the slip control (acceleration slip control) of the lock-up clutch 24 is satisfied or not. At the point of time t0, the vehicle running condition is in the slip control area of FIG. 4, and the lock-up clutch 24 is in the process of the acceleration slip control, so that an affirmative decision (YES) is obtained in step S4. Consequently, step S5 corresponding to the slip control continuing means 198 is implemented to command the slip control means 188 to continue the acceleration slip control of the lock-up clutch 24.

When the vehicle starts running on an uphill road during repeated execution of the control routine of FIG. 9, the vehicle speed V begins to be lowered due to a negative acceleration given to the vehicle due to the gradient of the uphill road surface. As a result, the reference acceleration rate MOBGBU becomes higher than the actual acceleration rate MOBGBW at a point of time t1, whereby an affirmative decision (YES) is obtained in step S3. In this case, a suitable flag indicative of the uphill running of the vehicle is set to "1", and the control flow goes to step S6 corresponding to the clutch control mode determining means 194, to determine whether the lock-up clutch 24 is in the process of the acceleration slip control. Since the acceleration slip control of the lock-up clutch 24 was initiated before the point of time t0, and the lock-up clutch 24 is in the acceleration slip control at the point of time t1, an affirmative decision (YES) is obtained in step S6, and the control flow goes to step S4 to determine whether the vehicle condition is in the slip control area of FIG. 4. Since the affirmative decision (YES) is obtained in step S4 at the point of time t1, the control flow goes to step S5 to continue the acceleration slip control of the lock-up clutch 24.

The throttle opening angle TA is increased to raise the vehicle speed V which has been lowered due to the uphill road surface gradient. When the throttle opening angle TA has exceeded an upper limit θ1 of the slip control area of FIG. 4 at a point of time t2, the vehicle condition falls in the fully releasing area of FIG. 4, whereby a negative decision (NO) is obtained in step S4, and the control flow goes to step S7 to terminate the acceleration slip control of the lock-up clutch 24 by zeroing the duty ratio $D_{SLU}$ of the linear solenoid valve SLU. In this case, a suitable flag indicative of the inhibition of the slip control of the lock-up clutch 24 is set to "1". It will be understood that the acceleration slip control of the lock-up clutch 24 is not terminated immediately after the detection of an uphill road, but is terminated when the slip control condition is lost, namely, only after the vehicle condition turns into the fully releasing area of FIG. 4.

Once the acceleration slip control of the lock-up clutch 24 is terminated in step S7, a negative decision (NO) is obtained in step S6, and the control flow goes to step S8 corresponding to the slip control inhibiting means 192, to inhibit the acceleration slip control of the lock-up clutch 24 and hold the clutch 24 in the fully released state, irrespective of whether the slip control condition is satisfied or not.

The vehicle speed V is raised by the above-indicated increase in the throttle opening angle TA, and the vehicle operator operates the accelerator pedal 50 toward the fully released position, whereby the throttle opening angle TA is reduced. As a result, the throttle opening angle TA is lowered below the upper limit θ1 at a point of time t3. As long as the uphill road is detected (the affirmative decision is obtained in step S3, with the uphill road flag being set at "1"), however, step S4 is not implemented, that is, the control flow goes to step S8 via step S6, whereby the inhibition of the slip control of the lock-up clutch 24 is continued with the slip control inhibition flag being set at "1".

In the above-described arrangement of the present slip control apparatus, the acceleration slip control of the lock-up clutch 24 is not resumed during the uphill road running of the vehicle. If the uphill road running is terminated at a point of time well after the point of time t3, the negative decision (NO) is obtained in step S3, and step S4 is implemented to determine whether the slip control condition is satisfied or not. If the vehicle condition falls in the slip control area of FIG. 4, again, the acceleration slip control of the lock-up clutch 24 is resumed in step S5. If the slip control condition is not satisfied, step S7 is implemented to hold the lock-up clutch 24 in the fully released state.

Then, the inhibition of the deceleration slip control of the lock-up clutch 24 will be described. During deceleration of the vehicle with the speed V being lowered, the throttle opening angle TA is zero as indicated by one-dot chain line in FIG. 10, with the engine idling switch placed in the ON position.

During the time period between the points of time t1 and t2, the affirmative decision (YES) is obtained in step S3 (with the uphill road flag being set at "1"), and the affirmative decision (YES) is obtained in step S6 with the lock-up clutch 24 held in the deceleration slip control mode. Consequently, the control flow goes to step S4 during this time period. Since the vehicle speed V is higher than a lower limit V1 of the slip control area of FIG. 4, that is, since the vehicle condition is in the slip control area, the affirmative decision (YES) is obtained in step S4 during the time period ending at t2, and the control flow goes to step S5 to continue the deceleration slip control of the lock-up clutch 24 until the vehicle speed V has been lowered below the lower limit V1.

When the vehicle speed V has been lowered below the lower limit V1 at the point of time t2, the vehicle condition as defined by the throttle opening angle TA and the vehicle speed V falls in the fully releasing area of FIG. 4, and the negative decision (NO) is obtained in step S4, whereby the deceleration slip control of the lock-up clutch 24 is terminated in step S7. Thereafter, as long as the affirmative decision (YES) is obtained in step S3, the negative decision (NO) is obtained in step S6, and the deceleration slip control is inhibited in step S8, without the determination in step S4 as to whether the slip control condition is satisfied or not. Described more specifically, the vehicle speed V may be raised above the lower limit V1 by depression of the accelerator pedal 50 after t2. If the accelerator pedal 50 is thereafter returned to its fully released position to zero the throttle opening angle TA, the deceleration slip control condition is satisfied. However, once the deceleration slip control is terminated in step S7 at the point of time t2, the decision in step S6 remains negative, and the determination in step S4 is not implemented. According to this arrangement, the deceleration slip control of the lock-up clutch 24 is continuously inhibited in step S8, and the lock-up clutch 24 is held in the fully released state as long as the vehicle is running on the uphill road.

The present slip control apparatus is further adapted such that once one of the the acceleration and deceleration slip controls of the lock-up clutch is inhibited during running of the vehicle on an uphill road, not only the resumption of this slip control but also the initiation of the other slip control are inhibited. To this end, different boundaries of the fully releasing, fully engaging and slip control areas of the lock-up clutch 24 are used in the determination in step S4 based on the vehicle speed V and the throttle opening angle TA.

In the specific examples described above, the vehicle running on an uphill road is initiated during acceleration or deceleration slip control of the lock-up clutch 24. If the vehicle running on the uphill road is initiated while the lock-up clutch 24 is not in the process of slip control, the negative decision (NO) is obtained in step S6 immediately after the initiation of the uphill road running, and the slip control is inhibited in step S8, so that the slip control is not effected throughout the uphill road running of the vehicle.

It will be understood from the foregoing explanation of the present embodiment that the initiation of the slip control of the lock-up clutch 24 by the slip control means 188 is inhibited in step S8 corresponding to the slip control inhibiting means, if the road surface is detected as an uphill road in step S3 by the uphill road detecting means 190. Once the lock-up clutch 24 is fully released during running of the vehicle on an uphill road, the lock-up clutch 24 is held in its fully released state throughout the uphill road running of the vehicle.

As discussed above, the present slip control apparatus is adapted such that the slip control of the lock-up clutch 24 is not resumed during running of the vehicle on the uphill road. Thus, the present apparatus is effective to minimize the frequency of repetition of alternate initiation and termination of the slip control of the lock-up clutch 24, and the deterioration of the driving comfort.

If the deceleration slip control of the lock-up clutch 24 is effected during uphill running of the vehicle, the vehicle is considerably decelerated due to not only a negative acceleration caused by the uphill road surface gradient but also a negative acceleration caused by the deceleration slip control. If the acceleration slip control of the clutch 24 is effected during uphill running, a drive force of the vehicle is reduced in the absence of torque amplification by the torque converter 12. In the light of these facts, the lock-up clutch 24 is preferably kept in the fully released state during the uphill running of the vehicle, irrespective of whether the vehicle is in acceleration or deceleration. According to the present slip control apparatus, however, the lock-up clutch 24 is held in the fully released state once it is placed in the fully released state during the uphill running of the vehicle. Accordingly, the driving comfort of the vehicle is further improved.

The present slip control apparatus includes the clutch control mode determining means 194 for determining in step S4 whether the lock-up clutch 24 is in the process of slip control, the slip control condition determining means 196 for determining in step S4 whether the condition for initiating the slip control of the lock-up clutch 24 is satisfied, the slip control continuing means 198 for commanding in step S5 the slip control means 188 to continue the slip control of the lock-up clutch 24 until the negative decision (NO) is obtained in step S4 by the slip control condition determining means 196, if the affirmative decision (YES) is obtained in step 53 by the uphill road detecting means 190 and if the affirmative decision (YES) is obtained in step S6 by the clutch control mode determining means 194.

In the above arrangement, the slip control of the lock-up clutch 24 is continued by the slip control continuing means 198 until the negative decision is obtained by the slip control condition determining means 196, as long as the slip control mode of the lock-up clutch 24 is detected by the clutch control mode determining means 194 during uphill running of the vehicle. If the uphill running of the vehicle is initiated during the slip control of the lock-up clutch 24, the slip control is continued until the slip control condition is lost. After the slip control condition is lost, the initiation of the slip control is inhibited by the slip control inhibiting means 192. The present arrangement is effective to prevent repetition of alternate full releasing and slip control of the lock-up clutch 24, termination of the slip control, and unexpected increase of the engine speed due to the termination of the slip control, which would deteriorate the driving comfort of the vehicle.

While one presently preferred embodiment of the present invention has been described in detail by reference to the accompanying drawings, the present invention may be otherwise embodied.

In the illustrated embodiment, the lock-up clutch relay valve 98 and the lock-up clutch control valve 100 are adapted such that the SLIP CONTROL pilot pressure $P_{SLU}$ is increased from zero to first switch the lock-up clutch relay valve 98 to the ON position, and then increase the pressure difference (Pon - Poff) of the lock-up clutch 24 for eventually placing the lock-up clutch in the partially engaged or slipping state. However, the relay valve 98 and control valve 100 may be constructed such that the pilot pressure $P_{SLU}$ may be lowered from the highest level to first switch the lock-up clutch relay valve 98 to its ON position, and then increase the pressure difference (Pon - Poff) for eventually placing the lock-up clutch in the partially engaged state.

The illustrated embodiment is adapted such that the reference acceleration rate MOBGBU calculated on the basis of the throttle opening angle TA, vehicle speed V and currently established position of the automatic transmission 14 is compared with the actual acceleration rate MOBGBW calculated on the basis of the rate of change of the vehicle speed V, to detect an uphill road. However, the detection of the uphill road may be effected by using a gradient sensor arranged to detect the gradient of the road surface. In this case, steps s1 and S2 in the flow chart of FIG. 9 are eliminated, and step S3 is modified to determine whether the detected gradient of the road surface is higher than a predetermined threshold.

While the reference acceleration rate MOBGBU is compared with the actual acceleration rate MOBGBW to detect an uphill road in step S3 in the illustrated embodiment, step S3 may be modified to determine whether the reference acceleration rate MOBGBU is higher than the actual acceleration rate MOBGBW by more than a predetermined value. In this modified arrangement, the slip control of the lock-up clutch 24 is not inhibited in a case where the actual MOBGBW is only slightly lower than the reference MOBGBU. In such a case, it is generally desirable not to inhibit the slip control of the lock-up clutch 24.

The illustrated embodiment wherein step S6 corresponding to the clutch control mode determining means 194 is provided is adapted to continue the slip control of the lock-up clutch 24 as long as the predetermined slip control condition is satisfied, even when the vehicle is running on an uphill road. However, steps S4 through S7 may be eliminated. In this case, the slip control of the lock-up clutch 24 is inhibited immediately when an uphill running of the vehicle is detected. This arrangement is also effective to prevent repetition of alternate initiation and termination of the slip control of the lock-up clutch 24.

Although the control routine of Fig. is formulated to inhibit the initiation of the slip control (repetition of alternate initiation and termination) of the lock-up clutch 24, the control routine may be modified to also inhibit the full engagement (repetition of alternate full engagement and full releasing) of the lock-up clutch. In this case, step S4 is modified to determine whether the vehicle condition is in the slip control area or the fully engaging area of FIG. 4 or not, and step S6 is modified to determine whether the lock-up clutch 24 is in the fully or partially engaged state or not (or in the fully released state).

It is to be understood that the present invention may be embodied with various other changes, modifications and improvements, which may occur to those skilled in the art, without departing from the spirit and scope of the invention defined in the following claims.

What is claimed is:

1. An apparatus for controlling a lock-up clutch for direct connection of an engine and an automatic transmission of a motor vehicle, said apparatus including slip control means for selectively placing said lock-up clutch in one of a fully released state, a fully engaged state, and a partially engaged state, said apparatus comprising:

uphill road detecting means for detecting that a road on which the motor vehicle is running is an uphill road; and slip control inhibiting means for inhibiting said slip control means from placing said lock-up clutch in said fully or partially engaged state, if said uphill road is detected by said uphill road detecting means.

2. An apparatus according to claim 1, further comprising:

clutch control mode determining means for determining whether said lock-up clutch is in said fully or partially engaged state or not;

Slip control condition determining means for determining whether a predetermined condition for placing said lock-up clutch in said fully or partially engaged state is satisfied or not; and slip control continuing means for commanding said slip control means to hold said lock-up clutch in said fully or partially engaged state until a negative decision is obtained by said slip condition determining means, if an affirmative decision is obtained by said clutch control mode determining means and if said uphill road is detected by said uphill road detecting means.

3. An apparatus according to claim 1, wherein said uphill road detecting means includes:

a throttle sensor for detecting an opening angle of a throttle valve of the engine;

a vehicle speed sensor for detecting a running speed of the vehicle;

a sensor for detecting a currently established position of said automatic transmission;

first calculating means for calculating a reference acceleration rate of the vehicle on the basis of the detected opening angle of the throttle valve, the detected running speed of the vehicle, and the detected currently established position of the automatic transmission;

second calculating means for calculating an actual acceleration rate of the vehicle on the basis of a rate of change of the detected running speed of the vehicle; and determining means for determining that the road surface on which the vehicle is running is an uphill road, on the basis of a comparison of said reference and actual acceleration rates of the vehicle calculated by said first and second calculating means.

4. An apparatus according to claim 2, wherein said slip condition determining means comprises a throttle sensor for detecting an opening angle of a throttle valve, and a vehicle speed sensor for detecting a running speed of the vehicle, and determining means for determining whether a vehicle running condition as represented by the detected opening angle of said throttle valve and the detected running speed of the vehicle falls in one of a fully engaging area in which said lock-up clutch should be fully engaged and a slip control area in which an amount of slip of said lock-up clutch should be controlled while said lock-up clutch is placed in said partially engaged state, said slip control condition determining means determining that said predetermined condition is satisfied if said vehicle running condition falls in one of said fully engaging area and said slip control area.

5. An apparatus according to claim 2, wherein said clutch control mode determining means comprises means for detecting an output of said slip control means, and means for determining whether said lock-up clutch is placed in said fully or partially engaged state, on the basis of the detected output of said slip control means.

6. An apparatus according to claim 1, wherein said lock-up clutch is incorporated in a torque converter interposed between said engine and said automatic transmission.

* * * * *